United States Patent [19]

Hoogendonk

[11] 3,993,785

[45] Nov. 23, 1976

[54] PROCESS FOR THE PREPARATION OF AN ADDITIVE FOR MAIZE SILAGE ON THE BASIS OF PRILLED UREA

[75] Inventor: Johan W. Hoogendonk, Geleen, Netherlands

[73] Assignee: Unie Van Kunstmestfabrieken B.V., Utrecht, Netherlands

[22] Filed: Apr. 3, 1975

[21] Appl. No.: 564,900

Related U.S. Application Data

[63] Continuation-in-part of Ser. No. 371,497, June 19, 1973, abandoned.

[30] Foreign Application Priority Data

June 23, 1972 Netherlands ...................... 7208608

[52] U.S. Cl. .................................. 426/69; 426/807
[51] Int. Cl.² ............................................ A23K 1/22
[58] Field of Search ................. 426/69, 807; 264/7, 264/13

[56] References Cited

UNITED STATES PATENTS

| | | |
|---|---|---|
| 3,533,776 | 10/1970 | Coates et al. ........................ 264/7 X |
| 3,585,043 | 6/1951 | Moore et al. ......................... 426/69 |
| 3,635,725 | 1/1972 | Baskin ................................. 426/69 |

FOREIGN PATENTS OR APPLICATIONS 312,594   2/1971   U.S.S.R. ............................. 426/69

Primary Examiner—Joseph M. Golian
Attorney, Agent, or Firm—Cushman, Darby & Cushman

[57] ABSTRACT

Mineral-enriched urea prills for addition to maize silage are prepared using conventional urea prilling equipment by rapidly mixing a urea melt with a mineral enrichment composition containing up to 22% weight of sodium chloride in a rapid manner such that at most only about one-third of the total sodium chloride content is dissolved, the balance remaining in suspension, mixing typically requires no more than about 7 seconds, then the melt is sprayed to prills and cooled.

6 Claims, 4 Drawing Figures

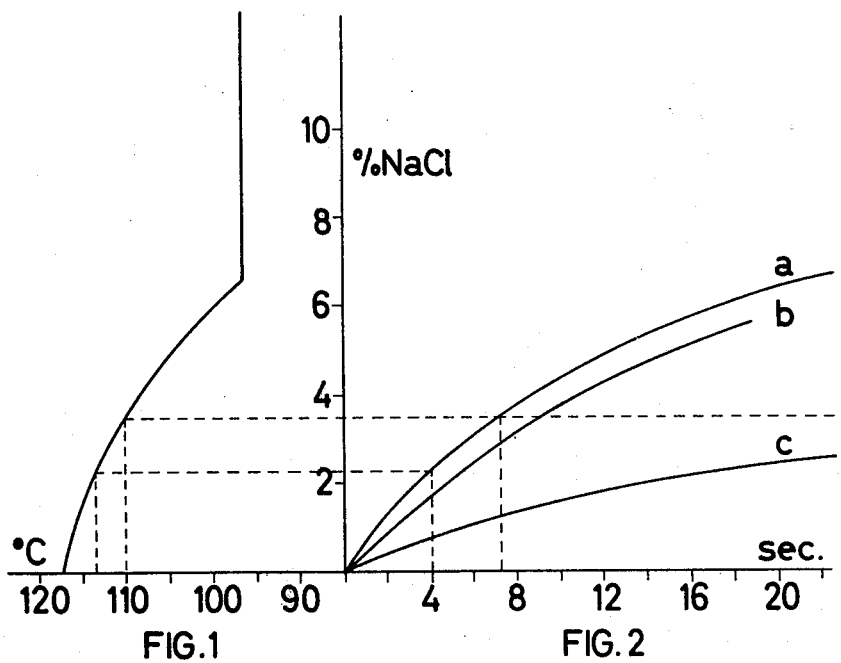

PROCESS FOR THE PREPARATION OF AN ADDITIVE FOR MAIZE SILAGE ON THE BASIS OF PRILLED UREA

CROSS REFERENCE TO RELATED APPLICATION

This application is a continuation-in-part of my earlier application Ser. No. 371,497 filed June 19, 1973 and now abandoned.

BACKGROUND OF THE INVENTION

The invention relates to a process for the preparation of prilled urea type additive for maize silage. Prills are globular particles, which are obtained in a known manner by spraying a melt, such as a urea or fertilizer melt, in the form of droplets from a perforated, rapidly rotating reservoir under the influence of the reservoir's centrifugal force, and thereafter allowing the falling droplets to cool down and solidify to form very uniform particles of a globular shape.

Maize silage is a cattle feed obtained by mowing the maize while green, then cutting the mown maize, and preserving it in a silo. The ensiled product contains too little protein relative to its starch content and, according to known procedures to correct this deficiency it is customary, before ensiling the product, to add urea to the maize during the cutting operation. It is recommended if the maize has a dry matter content of 30 % by weight, to add the urea in an amount by weight equalling 0.5 % calculated to the weight of maize.

However, compared with grass, maize conditioned with urea is also deficient in mineral constituents. In fact, according to a publication by a French cattle-breeding experimental station, the Institut Technique de l'Elevage Bovin, at Paris, this deficiency can be remedied by adding to the maize, besides urea, a mineral additive mixture, as a supplement to adjust the mineral content of the urea treated maize to compare favorably with grass. The mineral additive mixture consists essentially of:

| | |
|---|---|
| dicalcium phosphate | 60 % wt |
| sodium chloride (iodized) | 20 % wt |
| sodium sulphate | 10 % wt |
| magnesium sulphate | 6.80 % wt | and the remainder consists of compounds of trace elements in the form of sulphates and the like such as:

| | |
|---|---|
| zinc sulphate | 1.00 % wt |
| iron sulphate | 1.50 % wt |
| manganese sulphate | 0.30 % wt |
| copper sulphate | 0.40 % wt |
| cobalt sulphate | 0.01 % wt |

The trace elements may also be added in the form of oxides or carbonates, instead of sulphates. In that case, a mixture having more or less the following composition may, for instance, be used.

| | |
|---|---|
| dicalcium phosphate | 60 % wt |
| sodium chloride (iodized) | 20 % wt |
| magnesium sulphate (kieserite) | 10.4 % wt |
| sodium sulphate | 8.7 % wt |
| iron carbonate | 0.52 % wt |
| zinc oxide | 0.15 % wt |
| cupric oxide | 0.13 % wt |
| manganese oxide | 0.10 % wt |
| cobalt oxide or cobalt carbonate | 0.003 % wt |

There is commercially available a granulated additive for maize silage which contains urea and mineral constituents in 1:1 weight ratio; as with urea it is supplied to the maize during cutting in an amount of 10 kgs per ton of maize if the dry-matter content of the maize is 30 %.

Unlike the mineral mixture recommended by the above experimental station, the commercial product, whose composition is largely identical to the recommended one, contains no magnesium sulphate, but magnesium carbonate in the form of dolomite; also it does not contain sodium chloride. Further, the commercial product consists of granules made by a technique other than the prilling process.

While prilling is not the only form of making the granules, on the other hand it is attractive for a urea manufacturer already having an existing plant to prepare a prilled additive on the basis of urea and mineral constituents in the same plant and equipment as is used for production of all-urea prills. The problem, however, is that, unlike a melt consisting of 100 % urea, a suspension made of a mixture based on about 50 % weight of urea and about 50 % wt. of the above mentioned mineral composition cannot simply be prilled in a tower built for the manufacture of urea prills, the height of fall of the tower being too small for the purpose.

As a general rule it can be stated that the preparation of urea prills with an average diameter of 1.7 mm requires a height of fall of 30 m; during their fall, the sprayed urea droplets cool down from 130° C to approximately 70° C, at which temperature they are sufficiently hard and deformationresistant. However, in contrast to the experience gained in the preparation of urea prills, it has been found that prills of the same size made by spraying a suspension of about 50 % weight of urea and about 50 % weight of minerals of the above composition are still soft at 70° C. Thus the addition of the minerals appears to have a considerable lowering effect on the crystallization point of the mixture, which implies that — if the prills are to cool down further and solidify — a much greater height of fall is required. We have found that the lowering of the crystallization point is caused mainly by sodium chloride dissolving in the urea melt and of the mineral constituents added to the urea, by far the largest portion — dicalcium phosphate and magnesium sulphate — remains in suspension. The sodium chloride component, which accounts for about 20 % of the total of mineral constituents, dissolves to a large part, and forms a eutectic mixture with the urea.

Accordingly it is an object of the present invention to provide a process for the preparation of a urea-based maize additive which also contains needed trace minerals in the form of prills using conventional urea prilling equipment.

BRIEF DESCRIPTION OF THE DRAWINGS

FIG. 1 is a graph illustrating the amount of sodium chloride, in weight percent, dissolved in the urea melt plotted against the crystallization temperature of the melt.

FIG. 2 illustrates graphically the relationship between the amount of sodium chloride, also in weight percent, that dissolves in the urea melt during a variable period of mixing times, reported in seconds, reflecting the dependence on the particle size of the sodium chloride.

DETAILED DESCRIPTION OF THE INVENTION

Figure 3:
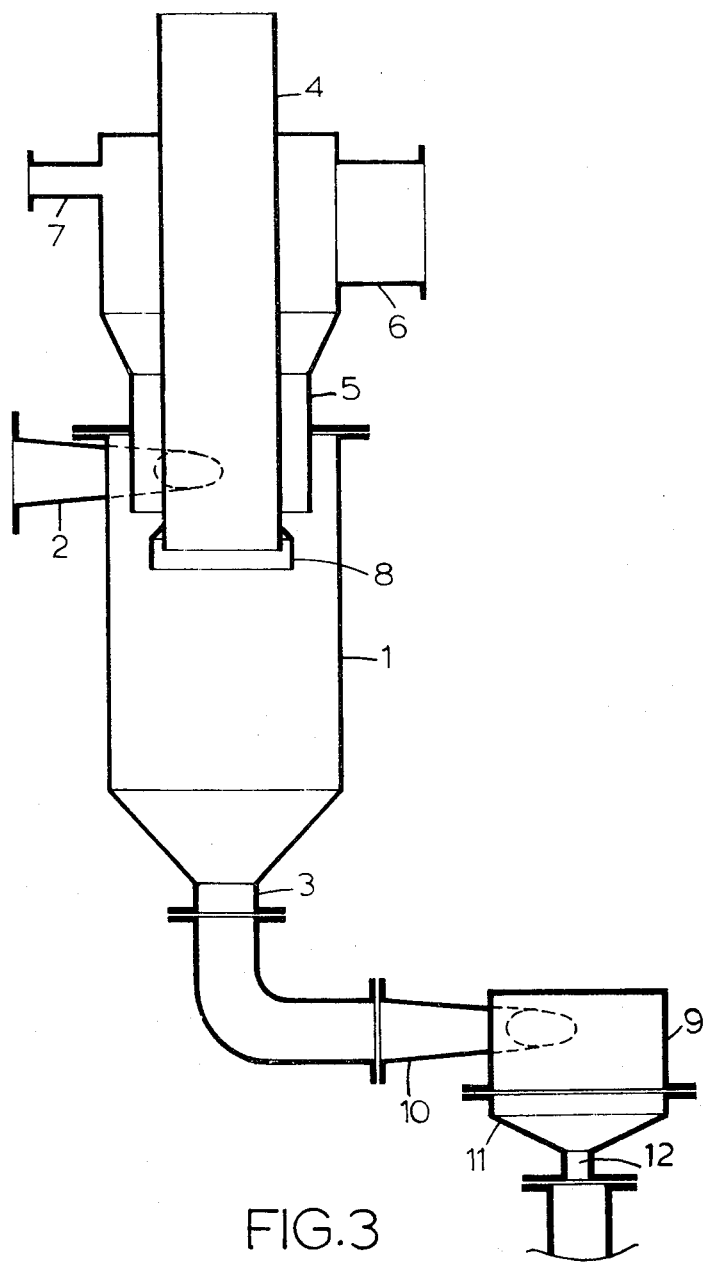
FIG. 3 is an axial section view of a mixing apparatus useful to achieve the short mixing times required by the present invention.

It has now been found that a urea additive for maize silage containing urea and mineral constituents in a weight ratio of from 3:2 to 2:3, the said mineral constituents including up to 60 % of dicalcium phosphate, to 20 % of sodium chloride, and sulphates of Na and Mg, as well as sulphates, oxides or carbonates of Zn, Fe, Mn, Cu and Co constituting the balance can be obtained in the form of prills if, prior to prilling, the mineral constituents are mixed with the molten urea in the required weight ratio and subsequently the resulting suspension of solid sodium chloride in the molten urea is sprayed in the customary urea-prilling installation and is transformed into prills, the mixing and spraying steps being carried out so rapidly that at most about a third of the sodium chloride present in the mixture goes into solution.

The influence of the amount of dissolved sodium chloride on the crystallization point of the urea melt is illustrated in the diagram of FIG. 1 where the crystallization temperature is plotted on the abscissa and the content of dissolved NaCl in % wt on the ordinate. This figure shows that the crystallization temperature of a urea melt with 0 % of NaCl, but otherwise mixed with the recommended quantities of minerals, is at 117° C and gradually decreases to 96° C as the NaCl content is correspondingly raised from 0 to over 6 %. As more NaCl is added the crystallization temperature does not decrease further because the urea melt is saturated with NaCl; NaCl added in excess of 6.3 % no longer goes into solution.

FIG. 2 shows the relation between the amount of NaCl in % wt (ordinate) dissolving in the urea melt within a given mixing time (sec) in dependence on the particle size of the NaCl. The figure includes three curves, marked a, b and c. Curve a relates to NaCl ground to such a size that $\bar{d}_{50} = 25\ \mu$, i.e. 50% of the particles is smaller than 25 $\mu$. Curve b relates to NaCl with $\bar{d}_{50} = 60\ \mu$, and curve c to NaCl with $\bar{d}_{50} = 385\ \mu$.

The diagram in FIG. 2 shows that the particle size has an appreciable effect on the dissolving rate; for example, the content of NaCl dissolving in the urea melt within a mixing time of 4 seconds equals 2.3% wt for the finely ground NaCl, against 1.8 and 0.8% wt for the coarser grades.

From practical experiments it has further appeared that the crystallization temperature of the mixture must be at least 110° C to ensure that prills made in a tower suited for production of urea prills will still possess sufficient hardness for handling and transporting. From a comparison of FIG. 1 with FIG. 2 it follows then that the content of dissolved NaCl in the urea melt must be at most 3.75%, i.e. that no more than roughly one-third of the total quantity of NaCl added may dissolve in the melt before the melt is sprayed.

As the total content of NaCl in the mineral mixture equals about 20 % — so, in the urea-mineral mixture (weight ratio: 1/1): about 10 %. The maximum admissible content of NaCl appears to be 3.75 %, i.e. approximately one-third of the total quantity. This content of dissolved NaCl is obtained by using mixing times of 7 seconds, or shorter, with the finest NaCl grade. However, to avoid all troubles, it is recommendable to use a much shorter mixing time for NaCl particles with $\bar{d}_{50} = 50\ \mu$, e.g. 4 – 5 seconds.

Application of coarse NaCl in the prilling process is not advisable because this may given rise blockage of the spray apertures of the prilling equipment.

The requirement that short mixing times be used can be satisfied by introducing the melt along a tangential path into a funnel-shaped, frusto-conical mixing vessel of known design, in which it moves down along the funnel wall as a rotary film, and supplying the solid material to be dissolved or suspended along an axial path. In a mixing vessel of this type mixing times shorter than 3, and even as low as 2 seconds, can be achieved.

An axial section through such a mixing vessel is illustrated in FIG. 3. In this Figure the actual cylindrical mixing vessel 1 is provided with a feedpipe 2 for the urea melt, which discharges tangentially into the cylinder. The base end of the mixing vessel is funnel-shaped, and is provided with an outlet 3. Positioned in the axis of the mixing vessel is a feedpipe 4 along which the solid material to be dissolved or suspended is supplied. The feedpipe is fitted with a shell 5 which has a suction port 6 and a feedpipe 7.

Suction port 6 serves to draw off very fine particles entrained by the solid material; the feed pipe serves for supplying water to remove incrustated material from the wall of the equipment. Further, the lower end of feedpipe 4 is provided with a collar 8 to prevent fouling and, hence narrowing of the feedpipe by solid matter.

If, as the process of the present invention is carried out, it should appear that one mixing apparatus is not sufficient for preparing a homogeneous solution or suspension, the mixing vessel can be series connected to another one, 9, in which the whole mixture is homogenized by the fast rotary motion imparted to it by the tangential feed pipe 10 and the funnel-shaped part 11 of the mixing vessel. Thus, a conventional prilling device can be connected directly with vessel 1 or with mixing vessel 9.

Prilling of urea is a well-known conventional process practiced on a wide commercial scale. Illustrative U.S. patents describing suitable equipment and techniques include U.S. Pat. Nos. 3,055,049; 3,083,406 and 3,249,657.

Summarizing the above, since a given low NaCl content of the urea melt is a critical condition for obtaining prills of the desired properties, and this content depends on the mixing time involved, it may be considered desirable in practicing the process according to the invention to add the other minerals to the urea melt first and finally, the sodium chloride.

The mineral constituents may be added to the urea melt in the cold state; they need not be preheated. To reduce the moisture content of the ultimate prills and rule out the need for an after-drying stage one may, instead of adding the mineral salts in their hydrate form, introduce them, in whole or in part as anhydrous salts.

Since dicalcium phosphate and magnesium sulphate are present in the mineral mixture in relatively large amounts, the use of these salts in their anhydrous form in itself results in a considerable reduction in water content. Addition of the trace elements in the form of oxides or carbnates, instead of in the form of sulphates involves the advantage that the mixture of the oxides may be prepared and stored a considerable time prior to being used without there being any risk of caking.

Figure 4:
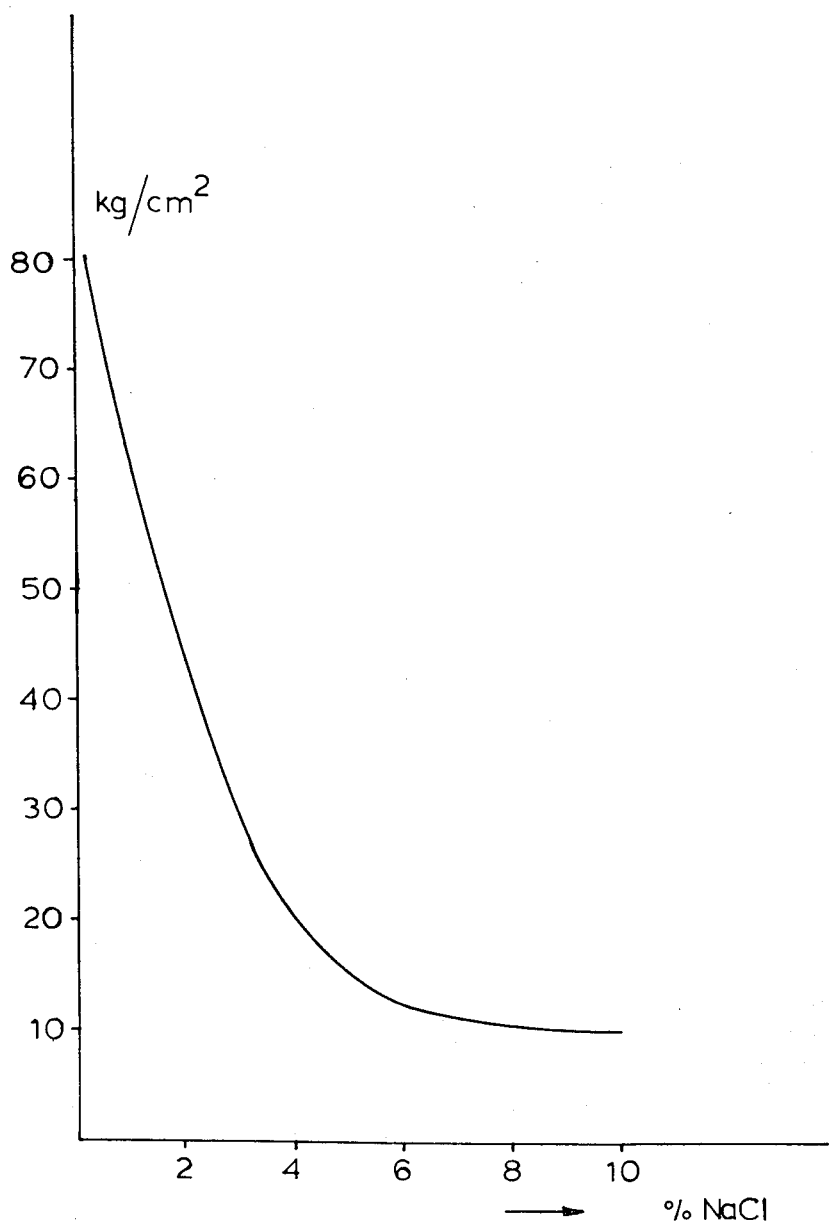
FIG. 4 is a graph illustrating the influence of sodium chloride dissolved in the urea melt on the crushing strength of the resulting prills.

The influence that the percentage of dissolved NaCl in the urea melt has on the quality of the ultimate prills also appears from the diagram in FIG. 4, which shows how the crushing strength of the prills varies with the amount of dissolved sodium chloride. The amount of dissolved sodium chloride in percent by weight, is plotted on the abscissa, and the crushing strength of the prills, in kg/cm$^2$, on the ordinate.

It will be evident that the ratios in the urea additive for maize silage are not very critical. A 1:1 weight ratio between urea and the mineral constituents is meant to cover all products within the range of ratios from 2:3 to 3:2. Neither does a slight deviation from the recommended composition have any substantial effect on the quality of the maize silage. A good product is also obtained if the quantities differ by +10 to −10% from the percentages mentioned. This means for example that the dicalcium phosphate content of the mineral mixture may lie between 54 and 66%, the sodium chloride content between 18 and 22%, sodium sulphate between 9 and 11%, magnesium sulphate between 6 and 8%, while the total weight-percentage of the sulphates of zinc iron, manganese, copper and cobalt may be somewhere between 2.5 and 3%.

Instead of being added as magnesium sulphate, the magnesium may also be introduced in the form of the carbonate, or as dolomite.

If the trace elements are added in the form of oxides or carbonates the sodium sulphate content may vary between 8 and 9.5%, and the magnesium sulphate content between 9 and 11%, while the total percentage by weight of oxides and or carbonates of zinc, iron, manganese, copper and cobalt may amount to about 1%.

What is claimed is:

1. In a process for preparing mineral-enriched particulate urea for an additive to maize silage, the mineral-enriched urea particles containing urea and a mineral enrichment composition in a weight ratio of from 3:2 to 2:3, the mineral enrichment composition comprising, 54 – 66% dicalcium phosphate, 18 – 22% sodium chloride, 9 – 11% sodium sulfate, 6 – 8% magnesium sulfate and the balance consisting essentially of 2.5 – 3% of the sulfates and carbonates of zinc, iron, manganese, copper and cobalt, said process comprising mixing the mineral enrichment composition with a molten urea melt in the said weight ratio and then spraying the resulting mixture and cooling into prills, the improvement of forming prills by spraying the resulting mixture and cooling into prills while avoiding formation of a substantial portion of eutectic mixture of sodium chloride and urea by conducting the mixing and the spraying steps in a short amount of time such that at most about one-third of the amount of sodium chloride present in the mineral enrichment composition dissolves the urea component of the urea-mineral enrichment mixture, the balance of the sodium chloride remaining in suspension within the resulting enriched urea prill.

2. In a process for preparing mineral-enriched particulate urea for an additive to maize silage, the mineral-enriched urea particles containing urea and a mineral enrichment composition in a weight ratio of from 3:2 to 2:3, the mineral enrichment composition comprising, 54 – 66% dicalcium phosphate, 18 – 22% sodium chloride, 9 – 11% sodium sulfate, 6 – 8% magnesium carbonate or dolomite and the balance consisting essentially of 2.5 – 3% of the sulfates and carbonates of zinc, iron, manganese, copper and cobalt, said process comprising mixing the mineral enrichment composition with a molten urea melt in the said weight ratio and then spraying the resulting mixture and cooling into prills, the improvement of forming prills by spraying the resulting mixture and cooling into prills while avoiding formation of a substantial portion of a eutectic mixture of sodium chloride and urea by conducting the mixing and the spraying steps in a short amount of time such that at most about one-third of the amount of sodium chloride present in the mineral enrichment composition dissolves the urea component of the urea-mineral enrichment mixture, the balance of the sodium chloride remaining in suspension within the resulting enriched urea prill.

3. In a process for preparing mineral-enriched particulate urea for an additive to maize silage, the mineral-enriched urea particles containing urea and a mineral enrichment composition in a weight ratio of from 3:2 to 2:3, the mineral enrichment composition comprising, 54 – 66% dicalcium phosphate, 18 – 22% sodium chloride, 8 – 9.5% sodium sulfate, 9 – 11% magnesium sulfate and the balance consisting essentially of about 1% of the oxides and carbonates of zinc, iron, manganese, copper and cobalt, said process comprising mixing the mineral enrichment composition with a molten urea melt in the said weight ratio and then spraying the resulting mixture and cooling into prills, the improvement of forming prills by spraying the resulting mixture and cooling into prills while avoiding formationof a substantial portion of a eutectic mixture of sodium chloride and urea by conducting the mixing and the spraying steps in a short amount of time such that at most about one-third of the amount of sodium chloride present in the mineral enrichment composition dissolves the urea component of the urea-mineral enrichment mixture the balance of the sodium chloride remaining in suspension within the resulting enriched urea prill.

4. In a process for preparing mineral-enriched particulate urea for an additive to maize silage, the mineral-enriched urea particles containing urea and a mineral enrichment composition in a weight ratio of from 3:2 to 2:3, the mineral enrichment composition comprising, 54 – 66% dicalcium phosphate, 18 – 22% sodium chloride, 9 – 11% sodium sulfate, 6 – 8% magnesium sulfate and the balance consisting essentially of 2.5 – 3% of the sulfates and carbonates of zinc, iron, manganese, copper and cobalt, said process comprising mixing the mineral enrichment composition with a molten urea melt in the said weight ratio and then spraying the resulting mixture and cooling into prills, the improvement of forming prills by spraying the resulting mixture and cooling into prills while avoiding formation of a substantial portion of a eutectic mixture of sodium chloride and urea by conducting the mixing and the spraying steps in a period of at most about 7 seconds such that at most about one-third of the amount of sodium chloride present in the mineral enrichment composition dissolves the urea component of the urea-mineral enrichment mixture, the balance of the sodium chloride remaining in suspension within the resulting enriched urea prill.

5. The process according to claim 1 wherein the mixing occurs in at most 7 seconds.

6. The process according to claim 1 wherein the mixing occurs in the order of about 4–5 seconds.

* * * * *